US012775701B2

(12) United States Patent
Karpovsky et al.

(10) Patent No.: US 12,775,701 B2
(45) Date of Patent: *Oct. 27, 2026

(54) ANOMALOUS BEHAVIOR DETECTION WITH RESPECT TO CONTROL PLANE OPERATIONS

(71) Applicant: Microsoft Technology Licensing, LLC, Redmond, WA (US)

(72) Inventors: Andrey Karpovsky, Kiryat Motzkin (IL); Ram Haim Pliskin, Rishon Lezion (IL); Evgeny Bogokovsky, Kfar-Saba (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 214 days.

This patent is subject to a terminal disclaimer.

(21) Appl. No.: 17/679,553

(22) Filed: Feb. 24, 2022

(65) Prior Publication Data

US 2023/0267198 A1 Aug. 24, 2023

(51) Int. Cl.
*G06F 21/55* (2013.01)

(52) U.S. Cl.
CPC ...... *G06F 21/554* (2013.01); *G06F 2221/034* (2013.01)

(58) Field of Classification Search
CPC ............. G06F 21/554; G06F 2221/034; G06F 21/6218; G06F 21/552; H04L 2463/121; H04L 63/1425
See application file for complete search history.

(56) References Cited

U.S. PATENT DOCUMENTS 8,379,857 B1 2/2013 Zheng
9,479,518 B1 * 10/2016 Fang .................. H04L 63/1425
(Continued)

FOREIGN PATENT DOCUMENTS

TW 201635742 A * 10/2016 ........... H04L 12/189

OTHER PUBLICATIONS

Author: Max Landauer et al., "A Framework for Cyber Threat Intelligence Extraction from Raw Log Data" 2019 IEEE International Conference on Big Data (Big Data). Published Feb. 28, 2020. (Year: 2019).*

(Continued)

*Primary Examiner* — Pramila Parthasarathy
(74) *Attorney, Agent, or Firm* — Ray Quinney & Nebeker P.C.

(57) ABSTRACT

Methods, systems, apparatuses, and computer-readable storage mediums described herein are configured to detect anomalous behavior with respect to control plane operations (e.g., resource management operations, resource configuration operations, resource access enablement operations, etc.). For example, a log that specifies an access enablement operation performed with respect to an entity is received. An anomaly score is generated indicating a probability whether the access enablement operation is indicative of anomalous behavior via an anomaly prediction model. A determination is made as to whether anomalous behavior has occurred with respect to the entity based at least on the anomaly score. Based on a determination that the anomalous behavior has occurred, a mitigation action may be performed that mitigates the anomalous behavior.

20 Claims, 6 Drawing Sheets

(56) References Cited

U.S. PATENT DOCUMENTS

| | | | | |
|---|---|---|---|---|
| 10,461,991 | B1 * | 10/2019 | Morley | H04L 41/40 |
| 11,558,193 | B2 | 1/2023 | Acharya | |
| 11,615,115 | B2 * | 3/2023 | Horowitz | G06F 16/2365<br>707/613 |
| 2007/0028099 | A1 | 2/2007 | Entin | |
| 2010/0192201 | A1 * | 7/2010 | Shimoni | G06F 21/55<br>726/3 |
| 2013/0145033 | A1 | 6/2013 | Polla | |
| 2013/0212484 | A1 * | 8/2013 | Joshi | H04L 67/04<br>715/740 |
| 2013/0275590 | A1 | 10/2013 | Wong | |
| 2015/0180894 | A1 * | 6/2015 | Sadovsky | H04W 12/12<br>726/22 |
| 2015/0229510 | A1 | 8/2015 | Rao | |
| 2017/0093878 | A1 * | 3/2017 | Rodniansky | G06F 21/85 |
| 2017/0099311 | A1 * | 4/2017 | Kesin | H04L 67/535 |
| 2017/0126627 | A1 | 5/2017 | Yang | |
| 2017/0126709 | A1 * | 5/2017 | Baradaran | H04L 63/1441 |
| 2017/0366576 | A1 | 12/2017 | Donahue | |
| 2019/0253443 | A1 * | 8/2019 | Vasudevan | H04L 67/12 |
| 2019/0306196 | A1 * | 10/2019 | Lango | G06F 21/575 |
| 2020/0111099 | A1 | 4/2020 | Benkreira | |
| 2020/0267057 | A1 * | 8/2020 | Garvey | H04L 41/0816 |
| 2020/0285737 | A1 * | 9/2020 | Kraus | G06F 21/552 |
| 2020/0327252 | A1 * | 10/2020 | Mcfall | G06F 21/78 |
| 2020/0380117 | A1 * | 12/2020 | Marwah | H04L 63/1425 |
| 2021/0194913 | A1 * | 6/2021 | Hecht | H04L 63/105 |
| 2021/0328969 | A1 * | 10/2021 | Gaddam | H04L 63/102 |
| 2021/0377210 | A1 | 12/2021 | Singh | |
| 2021/0406112 | A1 * | 12/2021 | Moss | G06F 11/0751 |
| 2022/0066998 | A1 * | 3/2022 | Jha | G06F 11/3476 |
| 2022/0121507 | A1 * | 4/2022 | Jha | G06F 9/546 |
| 2022/0159025 | A1 * | 5/2022 | Niv | G06F 9/546 |
| 2022/0247776 | A1 * | 8/2022 | Hecht | H04L 63/205 |
| 2023/0134546 | A1 * | 5/2023 | Gopalakrishnan | H04W 12/08<br>726/23 |
| 2023/0215198 | A1 * | 7/2023 | Cheluvaraju | G06V 10/40<br>382/190 |
| 2023/0231854 | A1 * | 7/2023 | Blake | H04L 63/1425<br>726/4 |
| 2023/0269262 | A1 | 8/2023 | Karpovsky et al. | |

OTHER PUBLICATIONS

"International Search Report and Written Opinion Issued in PCT Application No. PCT/US23/011090", Mailed Date: Apr. 5, 2023, 10 Pages.

"International Search Report and Written Opinion Issued in PCT Application No. PCT/US23/011091", Mailed Date: Apr. 14, 2023, 10 Pages.

Non-Final Office Action mailed on Jan. 9, 2024, in U.S. Appl. No. 17/679,550, 22 pages.

Final Office Action mailed on Apr. 22, 2024, is U.S. Appl. No. 17/679,550, 21 pages.

Non-Final Office Action mailed on Sep. 11, 2024, in U.S. Appl. No. 17/679,550, 44 pages.

Benova, et al., "Detecting anomalous user behavior from NGINX web server logs", 2022 IEEE Zooming Innovation in Consumer Technologies Conference (ZINC), May 25, 2022, 06 Pages.

Notice of Allowance mailed on Feb. 20, 2025, in U.S. Appl. No. 17/679,550, 11 Pages.

Wang, et al., "Detecting Anomalous Behaviours Based on System Logs: A Dynamic Graph Perspective", 2023 8th International Conference on Intelligent Computing and Signal Processing (ICSP)—IEEE, Apr. 21, 2023, pp. 528-532.

Notice of Allowance mailed on Apr. 8, 2025, in U.S. Appl. No. 17/679,550, 11 Pages.

* cited by examiner

400

500

600

ANOMALOUS BEHAVIOR DETECTION WITH RESPECT TO CONTROL PLANE OPERATIONS

BACKGROUND

Cloud computing refers to the on-demand availability of computer system resources, especially data storage (e.g., cloud storage) and computing power, without direct active management by the user. Cloud computing platforms (the networked system of processors and storage devices that provide such hardware and application services on-demand) offer higher efficiency, greater flexibility, lower costs, and better performance for applications and services relative to "on-premises" servers and storage. Accordingly, users are shifting away from locally maintaining applications, services, and data and migrating to cloud computing platforms. This migration has gained the interest of malicious entities, such as hackers. Hackers attempt to gain access to valid cloud subscriptions and user accounts in order to steal and/or hold ransom sensitive data or leverage the massive amount of computing resources for their own malicious purposes.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums described herein are configured to detect anomalous behavior with respect to control plane operations (e.g., resource management operations, resource configuration operations, resource access enablement operations, etc.). For example, a log that specifies an access enablement operation performed with respect to an entity is received. An anomaly score is generated indicating a probability whether the access enablement operation is indicative of anomalous behavior via an anomaly prediction model. A determination is made as to whether anomalous behavior has occurred with respect to the entity based at least on the anomaly score. Based on a determination that the anomalous behavior has occurred, a mitigation action may be performed that mitigates the anomalous behavior.

Further features and advantages, as well as the structure and operation of various example embodiments, are described in detail below with reference to the accompanying drawings. It is noted that the example implementations are not limited to the specific embodiments described herein. Such example embodiments are presented herein for illustrative purposes only. Additional implementations will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate example embodiments of the present application and, together with the description, further serve to explain the principles of the example embodiments and to enable a person skilled in the pertinent art to make and use the example embodiments.

Figure 1:
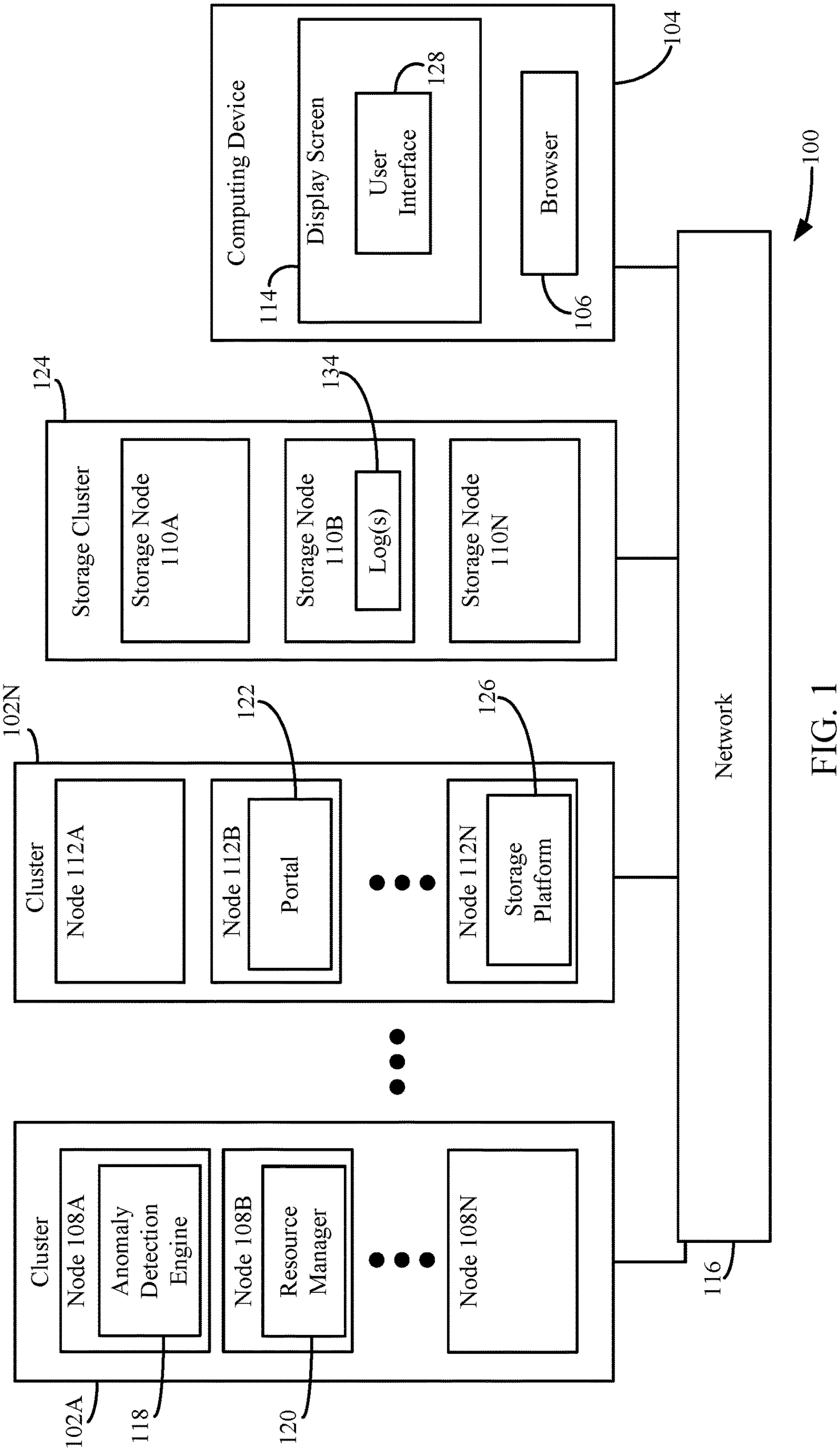
FIG. 1 shows a block diagram of a network-based computing system configured to detect anomalous behavior with respect to control plane operations in accordance with an example embodiment.

The features and advantages of the implementations described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose numerous example implementations. The scope of the present application is not limited to the disclosed implementations, but also encompasses combinations of the disclosed implementations, as well as modifications to the disclosed implementations. References in the specification to "one implementation," "an implementation," "an example embodiment," "example implementation," or the like, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of persons skilled in the relevant art(s) to implement such feature, structure, or characteristic in connection with other implementations whether or not explicitly described.

In the discussion, unless otherwise stated, adjectives such as "substantially" and "about" modifying a condition or relationship characteristic of a feature or features of an implementation of the disclosure, should be understood to mean that the condition or characteristic is defined to within tolerances that are acceptable for operation of the implementation for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous example embodiments are described as follows. It is noted that any section/subsection headings provided herein are not intended to be limiting. Implementations are described throughout this document, and any type of implementation may be included under any section/subsection. Furthermore, implementations disclosed in any section/subsection may be combined with any other implementations described in the same section/subsection and/or a different section/subsection in any manner.

II. Example Implementations

A cloud database is a database that runs on a cloud computing platform and is configured to be accessed as-a-service. Modern fully-managed cloud databases, such as Azure® Cosmos DB™ owned by Microsoft® Corporation of Redmond, Washington, are designed for application development and offer a variety of advanced features. Such databases offer massive built-in capabilities, such as data replication and multi-region writes, which automatically work behind the scenes, unattended by the users.

Intrusion detection services are a common and important security feature for cloud services, which monitor data plane traffic (e.g., application traffic, load balancing traffic, etc.) and generate mitigatable alerts on anomalous data traffic patterns, such as an anomalous amount of extracted data, access from an anomalous source, etc.

Intrusion detection services that monitor data plane traffic are challenging to implement for several reasons. For example, in modern databases, such as Azure® Cosmos DB™, individual identities (such as a user) and verbose commands (such as SQL queries) are not used for data plane operations. This makes suspicious behavior detection challenging, as most attacks are very similar to normal usage (such as operations for data exfiltration or deletion). In case of a data plane attack (such as data exfiltration for theft, data encryption for ransomware, etc.), post-factum detection is not efficient because the damage is already done and mostly irreversible.

Embodiments described herein are directed to detecting anomalous behavior with respect to control plane operations (e.g., resource management operations, resource configuration operations, resource access enablement operations, etc.). For example, a log that specifies an access enablement operation performed with respect to an entity is received. An anomaly score is generated indicating a probability whether the access enablement operation is indicative of anomalous behavior via an anomaly prediction model. A determination is made as to whether anomalous behavior has occurred with respect to the entity based at least on the anomaly score. Based on a determination that the anomalous behavior has occurred, a mitigation action may be performed that mitigates the anomalous behavior.

Such techniques address the problems described above with reference to data plane traffic monitoring. For instance, in accordance with the embodiments described herein, anomaly detection is utilized to detect suspicious authentication operations and alert a user before the actual payload of the attack is executed (i.e., before a malicious actor has the opportunity to access data and carry out the attack). Accordingly, the embodiments described herein provide improvements in other technologies, namely data security. For instance, the techniques described herein advantageously detect anomalous (e.g., malicious) control plane operations, thereby enabling an attack to be prevented in the very early stages thereof. This advantageously prevents access to personal and/or confidential information associated with the resource, as well as preventing access to the network and computing entities (e.g., computing devices, virtual machines, etc.) on which the resource is provided. In addition, by mitigating the access to such computing entities, the unnecessary expenditure of compute resources (e.g., central processing units (CPUs), storage devices, memory, power, etc.) associated with such entities is also mitigated. Accordingly, the embodiments described herein also improve the functioning of the computing entity on which such compute resources are utilized/maintained, as such compute resources are conserved as a result from preventing a malicious entity from utilizing such compute resources, e.g., for nefarious purposes.

For example, FIG. 1 shows a block diagram of an example network-based computing system 100 configured to detect anomalous behavior with respect to control plane operations, according to an example embodiment. As shown in FIG. 1, system 100 includes a plurality of clusters 102A and 102N, a storage cluster 124, and a computing device 104. Each of clusters 102A and 102N, storage cluster 124, and computing device 104 are communicatively coupled to each other via network 116. Network 116 may comprise one or more networks such as local area networks (LANs), wide area networks (WANs), enterprise networks, the Internet, etc., and may include one or more of wired and/or wireless portions.

Clusters 102A and 102N and/or storage cluster 124 may form a network-accessible server set (e.g., a cloud-based environment or platform). Each of clusters 102A and 102N may comprise a group of one or more nodes (also referred to as compute nodes) and/or a group of one or more storage nodes. For example, as shown in FIG. 1, cluster 102A includes nodes 108A-108N and cluster 102N includes nodes 112A-112N. Each of nodes 108A-108N and/or 112A-112N are accessible via network 116 (e.g., in a "cloud-based" embodiment) to build, deploy, and manage applications and services. Storage cluster 124 comprises one or more storage nodes 110A-110N. Each of storage node(s) 110A-110N comprises a plurality of physical storage disks that are accessible via network 116 and is configured to store data associated with the applications and services managed by nodes 108A-108N and/or 112A-112N.

In an embodiment, one or more of clusters 102A and 102N and/or storage cluster 124 may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 102A and/or 102N and/or storage cluster 124 may be a datacenter in a distributed collection of datacenters. In accordance with an embodiment, computing system 100 comprises part of the Microsoft® Azure® cloud computing platform, owned by Microsoft Corporation of Redmond, Washington, although this is only an example and not intended to be limiting, Each of node(s) 108A-108N and 112A-112N may comprise one or more server computers, server systems, and/or computing devices. Each of node(s) 108A-108N and 112A-112N may be configured to execute one or more software applications (or "applications") and/or services and/or manage hardware resources (e.g., processors, memory, etc.), which may be utilized by users (e.g., customers) of the network-accessible server set. Node(s) 108A-108N and 112A-112N and storage node(s) 110A-110N may also be configured for specific uses. For example, as shown in FIG. 1, node 108A may be configured to execute an anomaly detection engine 118, node 108B may be configured to execute a resource manager 120, node 112B may be configured to execute a portal 122, and node 112N may be configured to execute and/or host a storage platform 126. It is noted that instances of anomaly detection engine 118, resource manager 120, portal 122, and/or storage platform 126 may be executing on other node(s) (e.g., node(s) 108B-108N and/or node(s) 112A-112N) in lieu of or in addition to nodes 108A, 108B, 112B and 112N, respectively. It is further noted that one or more of anomaly detection engine 118, resource manager 120, portal 122, and storage platform 126 may be incorporated with each other.

In accordance with an embodiment, storage platform 126 is a distributed, multi-modal database service. Storage platform 126 may be configured to configured to execute statements to create, modify, and delete data stored in an associated database (e.g., maintained by one or more of storage node(s) 110A-110N) based on an incoming query, although the embodiments described herein are not so limited. Queries may be user-initiated or automatically generated by one or more background processes. Such queries may be configured to add data file(s), merge data file(s) into a larger data file, re-organize (or re-cluster) data file(s) (e.g., based on a commonality of data file(s)) within a particular set of data file, delete data file(s) (e.g., via a garbage collection process that periodically deletes unwanted or obsolete data), etc. An example of a distributed, multi-modal database service includes, but is not limited to Azure® Cosmos DB™ owned by Microsoft® Corporation of Redmond, Washington.

In accordance with another embodiment, storage platform 126 is a distributed file system configured to store large amounts of unstructured data (e.g., via storage node(s) 110A-110N). Examples of distributed file systems include, but are not limited to Azure® Data Lake owned by Microsoft® Corporation of Redmond, Washington, Azure® Blob Storage owned by Microsoft® Corporation of Redmond, Washington, etc.

A user may be enabled to utilize the applications and/or services (e.g., storage platform 126 and/or anomaly detection engine 118) offered by the network-accessible server set via portal 122. For example, a user may be enabled to utilize the applications and/or services offered by the network-accessible server set by signing-up with a cloud services subscription with a service provider of the network-accessible server set (e.g., a cloud service provider). Upon signing up, the user may be given access to portal 122. A user may access portal 122 via computing device 104. As shown in FIG. 1, computing device 104 includes a display screen 114 and a browser application (or "browser") 106. A user may access portal 122 by interacting with an application executing on computing device 104 capable of accessing portal 122. For example, the user may use browser 106 to traverse a network address (e.g., a uniform resource locator) to portal 122, which invokes a user interface 128 (e.g., a web page) in a browser window rendered on computing device 104. The user may be authenticated (e.g., by requiring the user to enter user credentials (e.g., a username, password, PIN, etc.)) before being given access to portal 122. Computing device 104 may be any type of stationary or mobile computing device, including a mobile computer or mobile computing device (e.g., a Microsoft® Surface® device, a laptop computer, a notebook computer, a tablet computer such as an Apple iPad™, a netbook, etc.), a wearable computing device (e.g., a head-mounted device including smart glasses such as Google® Glass™, etc.), or a stationary computing device such as a desktop computer or PC (personal computer).

Upon being authenticated, the user may utilize portal 122 to perform various cloud management-related operations (also referred to as "control plane" operations). Such operations include, but are not limited to, allocating, modifying, and/or deallocating cloud-based resources, building, managing, monitoring, and/or launching applications (e.g., ranging from simple web applications to complex cloud-based applications), configuring one or more of node(s) 108A-108N and 112A-112N to operate as a particular server (e.g., a database server, OLAP server, etc.), etc. Examples of cloud-based resources include, but are not limited to virtual machines, storage disks (e.g., maintained by storage node(s) 110A-110N), web applications, database servers, data objects (e.g., data file(s), table(s), structured data, unstructured data, etc.) stored via the database servers, etc. Portal 122 may be configured in any manner, including being configured with any combination of text entry, for example, via a command line interface (CLI), one or more graphical user interface (GUI) controls, etc., to enable user interaction.

Resource manager 120 may be configured to generate a log (also referred to as an "activity log") each time a user logs into his or her cloud services subscription via portal 122. The log (shown as log(s) 134) is an electronic file containing data of any suitable format (e.g., text, tables, computer code, encrypted data, etc.) and may be stored in one or more of storage node(s) 110A-110N (e.g., storage node 110B). The period in which a user has logged into and logged off from portal 122 may be referred to as a portal session. Each log may identify control plane operations that have occurred during a given portal session, along with other characteristics associated with the control plane operations. For example, each log of log(s) 134 may specify an identifier for the control plane operation, an indication as to whether the control plane operation was successful or unsuccessful, an identifier of the resource that is accessed or was attempted to be accessed, a time stamp indicating a time at which the control plane operation was issued, a network address from which the control plane operation was issued (e.g., the network address associated with computing device 104), an application identifier that identifies an application (e.g., portal 122, browser 106, etc.) from which the control plane operation was issued, a user identifier associated with a user (e.g., a username by which the user logged into portal 122) that issued the control plane operation, an identifier of the cloud-based subscription from which the resource was accessed or attempted to be accessed, a type of the entity (e.g., a user, a role, a service principal, etc.) that issued the control plane operation, a type of authentication scheme (e.g., password-based authentication, certificate-based authentication, biometric authentication, token-based authentication, multi-factor authentication, etc.) utilized by the entity that issued the control plane operation, an autonomous system number (ASN) associated with the entity that issued the control plane operation (e.g., a globally unique identifier that defines a group of one or more Internet protocol (IP) prefixes utilized by a network operator that maintains a defined routing policy), etc. An example of resource manager 120 includes but is not limited to Azure® Resource Manager™ owned by Microsoft® Corporation, although this is only an example and is not intended to be limiting.

In accordance with an embodiment, storage platform 126 is configured to provide access to resources maintained thereby via one or more access keys. Each of the access key(s) may be cryptographic access key(s) (e.g., a string of numbers and/or characters, for example, a 512-bit string) that are required for authentication when granting an entity access to one or more resources. Access key(s) are granted to an entity by resource manager 120. For instance, when a user, via portal 122, attempts to access a resource managed by storage platform 126, portal 122 may send a request for an access key that enables portal 122 to access the resource. The request is referred herein as an access enablement operation, as it is enables access to a resource. An access enablement operation is another example of a control plane operation. In accordance with an embodiment in which computing system 100 comprises part of the Microsoft® Azure® cloud computing platform, the request is a List Keys application programming interface (API) call. The request may specify, among other things, an identifier of the user or role that is attempting to access the resource, an identifier of the resource, and an identifier of the cloud-based subscription.

Resource manager 120 is configured to determine whether the requesting entity has permissions to access the resource(s) that the entity is attempting to access. For instance, resource manager 120 may include role-based access control functionality (RBAC). Such functionality may be used to ensure that only certain users, certain users assigned to certain roles within an organization, or certain cloud-based subscriptions are able to manage particular resources. For example, only certain users, roles, and/or subscriptions may be enabled to interact with resource manager 120 for the purposes of adding, deleting, modifying, configuring, or managing certain resources. Upon determining that the entity (e.g., a user, role, or subscription) is authorized to access a particular resource, resource manager 120 may send a response to portal 122 that includes the access key that enables access to that resource. Upon receiving the response, portal 122 may send a request to storage platform 126 that comprises the access key and an identifier of the resource attempting to be accessed. Storage platform 126 determines whether the request comprises a valid access key for the resource being attempted to be accessed. Upon determining that the request comprises a valid access key, storage platform 126 provides portal 122 access to the resource, and the resource may become viewable and/or accessible via portal 122.

The access keys maintained by resource manager 120 and the request sent by portal 122 to storage platform 126 do not specify any information that is specific to the entity that is attempting to access a resource. For instance, the access keys and the request do not specify any credentials (e.g., usernames, passwords, etc.) or user-specific identifiers. Contrast this to traditional database applications, where requests for resources maintained thereby specify user-specific information that identifies the user that is attempting access to such resources. Accordingly, storage platform 126 is unaware of which entity is attempting to access resource(s) maintained thereby. Instead, storage platform 126 is simply concerned with determining whether a valid access key is provided when accessing a particular resource.

Anomaly detection engine 118 may be configured to analyze log(s) 134 comprising control plane operations and assess whether certain control plane operations specified by log(s) 134 are indicative of anomalous or malicious behavior (e.g., a pattern of one or more control plane operations that deviate from what is standard, normal, or expected). In particular, anomaly detection engine 118 may be configured to analyze characteristics of each control plane operation to determine whether a particular control plane operation is uncharacteristic of (or anomalous with respect to) typical control plane operations issued by an entity. It is noted that anomaly detection engine 118 may be configured to analyze certain types of control plane operations (and not all control plane operations) that are more likely to be representative of malicious behavior. Such control plane operations include, but are not limited to, access enablement operations (e.g., requests for access keys maintained by resource manager 120), creating and/or activating new (or previously-used) user accounts, service principals, groups, cloud-based subscriptions, etc., changing user or group attributes, permission settings, security settings (e.g., multi-factor authentication settings), federation settings, data protection (e.g., encryption) settings, elevating another user account's privileges (e.g., via an admin account), retriggering guest invitation emails, etc. Examples of characteristics include, but are not limited to, an identifier of the resource that is accessed or was attempted to be accessed, a time stamp indicating a time at which the control plane operation was issued, a network address from which the control plane operation was issued, an application identifier that identifies an application from which the control plane operation was issued, a user identifier associated with a that issued the control plane operation, an identifier of the cloud-based subscription from which the resource was accessed or attempted to be accessed, a type of the entity that issued the control plane operation, a type of authentication scheme utilized by the entity that issued the control plane operation, an autonomous system number (ASN) associated with the entity that issued the control plane operation, etc.

To detect anomalous behavior, anomaly detection engine 118 may comprise an anomaly detection model that is configured to analyze the characteristics of control plane operations specified by log(s) 134 and detect anomalous control plane operations based on the analysis. For instance, for each of one or more of the characteristics of a particular control plane operation, the anomaly detection model may generate a score indicating whether the characteristic is anomalous with respect to the control plane operation.

For instance, the anomaly detection model may determine whether a control plane operation was issued from an unknown entity. For example, if the network address, application identifier, user identifier, cloud-based subscription identifier and/or the ASN number from which the control plane was issued is atypical (e.g., the control plane operation was issued from any of such identifiers that have not been seen before), then the score generated for such characteristics may be relatively higher. Otherwise, the score for such identifiers may be relatively lower.

In accordance with an embodiment, for each resource, anomaly detection engine 118 may maintain a list of network address identifiers, application identifiers, user identifiers, cloud-based subscription identifiers and/or ASN identifiers that are known to be non-malicious and/or are approved to access the resource. If the control plane operation is issued via a network address, an application, a user, a subscription, and/or an ASN that is not in the list, then the anomaly detection model may determine that the control plane operation is anomalous and generate one or more scores (respectively corresponding to one or more identifiers described above) accordingly. The anomaly detection model may be a statistical-based model (e.g., a Poisson probabilistic model, a graph model, etc.) or a machine learning-based model that learns (via a training process) what constitutes non-malicious entities (e.g., non-malicious network addresses, applications, users, subscriptions, ASNs, etc.) and learns what constitutes malicious entities (e.g., malicious network addresses, applications, users, subscriptions, ASNs, etc.) for a given resource over time. Examples of machine learning-based models include, but are not limited to, an unsupervised machine learning algorithm or a neural network-based machine learning algorithm (e.g., a recurrent neural network (RNN)-based machine learning algorithm, such as, but not limited to a long short-term memory (LSTM)-based machine learning algorithm)).

In another example, the anomaly detection model may determine whether access to a particular resource from a particular user, cloud-based subscription, ASN, network address, etc. is atypical (e.g., whether a resource is being accessed by any of such identifiers that have not been seen before for the resource). For example, this may detect whether a known (or non-malicious) entity is accessing a resource that the entity never accessed before (which may be indicative of that entity's credentials being compromised). If any of such identifiers are determined to be atypical for accessing the resource, then the score generated for such identifiers and/or the identifier for the resource may be relatively higher. Otherwise, the score for such identifiers may be relatively lower.

In accordance with an embodiment, for each network address identifier, application identifier, user identifier, cloud-based subscription identifier and/or ASN identifier, anomaly detection engine 118 may maintain a list of resources that are typically accessed thereby. If the control plane operation is issued for a particular resource via a network address, an application, a user, a subscription, and/or an ASN that is not in the list, then the anomaly detection model may determine that the control plane operation is anomalous and generate one or more scores (respectively corresponding to one or more identifiers described above) accordingly. The anomaly detection model may be a statistical-based model (e.g., that models the pair probability between a pair of variables (e.g., the resource and a network address, the resource and the user, the resource, and the cloud-based subscription, the resource and the network address, the resource and the application, the resource and the ASN, etc.)), may utilize similarity index-based approaches, may utilize collaborative filter-based approaches, etc. Alternatively, the anomaly detection model may be a machine learning-based model that learns (via a training process) which entities typically access a particular resource over time. Examples of machine learning-based models include, but are not limited to, an unsupervised machine learning algorithm or a neural network-based machine learning algorithm (e.g., a recurrent neural network (RNN)-based machine learning algorithm, such as, but not limited to a long short-term memory (LSTM)-based machine learning algorithm)).

In yet another example, the anomaly detection model may determine the authentication scheme used when issuing the control plane operation. If the authentication scheme is a relatively week scheme (e.g., password-based authentication), then the anomaly detection model may generate a score for the authentication scheme indicator that is relatively high. If the authentication scheme is a relatively strong scheme (e.g., multi-factor authentication), then the anomaly detection model may generate a score for the authentication scheme indicator that is relatively low.

Each score generated for a particular characteristic may be combined to generate an overall anomaly score with respect to the control plane operation. For example, anomaly detection engine 118 may add all the generated scores to generate the overall (or cumulative) anomaly score. The overall anomaly score may indicate a probability whether the control plane operation is indicative of anomalous behavior. For example, the overall anomaly score may comprise a value between 0.0 and 1.0, where higher the value, the greater the likelihood that the control plane operation is anomalous. It is noted that the values described above are purely exemplary and that other values may be utilized to represent the overall anomaly score.

Anomaly detection engine 118 may determine whether the overall anomaly score meets a threshold condition (e.g., an equivalence condition, a greater than condition, a less than condition, etc.). If a determination is made that the overall anomaly score meets the threshold condition, then anomaly detection engine 118 determines that the control plane operation is anomalous, and that anomalous behavior has occurred with respect to the entity that issued the control plane operation. If a determination is made that the overall anomaly score does not meet the threshold condition, then the anomaly detection engine determines that the control plane operation is not anomalous, and that anomalous behavior has not occurred with respect to the entity that issued the control plane operation.

In accordance with an embodiment, the threshold condition may be a predetermined value. In accordance with such an embodiment, anomaly detection engine 118 may be configured in one of many ways to determine that the threshold condition has been met. For instance, anomaly detection engine 118 may be configured to determine that the threshold condition has been met if overall anomaly score is less than, less than or equal to, greater than or equal to, or greater than the predetermined value.

In accordance with an embodiment, anomaly detection engine 118 may be implemented in and/or incorporated with Microsoft® Defender for Cloud™ published by Microsoft® Corp, Microsoft® Sentinel™ published by Microsoft® Corp., etc.

Responsive to determining that anomalous behavior has occurred, anomaly detection engine 118 may cause a mitigation action to be performed that mitigates the anomalous behavior. For example, anomaly detection engine 118 may issue a notification (e.g., to an administrator) that indicates anomalous behavior has been detected, provides a description of the anomalous behavior (e.g., by specifying the control plane operation determined to be anomalous, specifying the IP address(es) from which the control plane operation was initiated, a time at which the control plane operation occurred, an identifier of the entity that initiated the control plane operation, an identifier of the resource(s) that was accessed or attempted to be accessed, etc.), cause an access key utilized to access the resource(s) to be changed, or cause access to the resource(s) to be restricted for the entity. The notification may comprise a short messaging service (SMS) message, a telephone call, an e-mail, a notification that is presented via an incident management service, a security tool, portal 122, etc. Anomaly detection engine 118 may cause an access key utilized to access the resource(s) to be changed by sending a command to resource manager 120. For example, resource manager 120 may maintain a plurality of keys for a given entity (e.g., a primary key and a secondary key). Responsive to receiving the command, resource manager 120 may rotate the key to be utilized for accessing the resource (e.g., switch from using the primary key to using the secondary key). Anomaly detection engine 118 may cause access to a resource to be restricted (e.g., by limiting or preventing access) for the entity attempting access by sending a command to resource manager 120 that causes resource manager 120 to update access and/or permission settings for the entity with regards to the resource.

Figure 2:
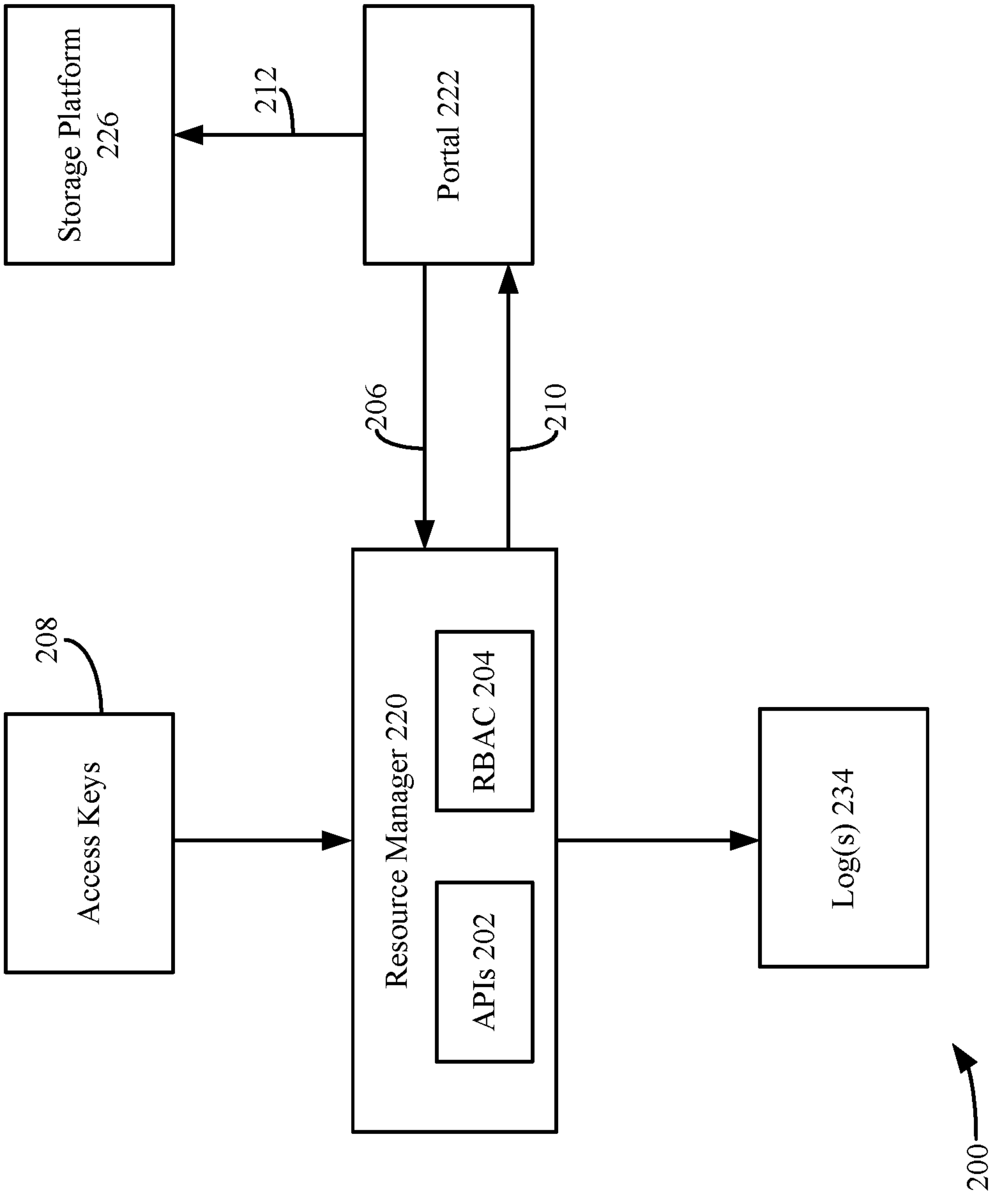
FIG. 2 depicts a block diagram of a system for logging control plane operations in accordance with an example embodiment.

FIG. 2 depicts a block diagram of a system 200 for logging control plane operations, according to an example embodiment. As shown in FIG. 2, system 200 comprises a resource manager 220, a portal 222, and a storage platform 226. Resource manager 220, portal 222, and storage platform 226 are examples of resource manager 120, portal 122, and storage platform 126, as respectively described above with reference to FIG. 1. As also shown in FIG. 2, resource manager 220 comprises application programming interfaces (APIs) 202 and RBAC functionality 204. APIs 202 may be utilized to request and manage resources, for example, made available via storage platform 226. APIs 202 may also be utilized to request access key(s) for access to resources. In one implementation, such APIs 202 may include REST APIs, although this is only a non-limiting example. RBAC functionality 204 may be used to ensure that only certain users, certain users assigned to certain roles within an organization, or certain cloud-based subscriptions are able to manage particular resources. For example, only certain users, roles, and/or subscriptions may be enabled to interact with resource manager 220 for the purposes of adding, deleting, modifying, configuring, or managing certain resources. RBAC functionality 204 may comprise a data structure (e.g., a table) that maps permissions to various users, roles, and/or cloud-based subscriptions.

When a user, via portal 222, attempts to access a resource managed by storage platform 226, portal 222 may send a request 206 for an access key that enables portal 222 to access the resource (i.e., portal 222 sends an access enablement operation) utilizing APIs 202. In accordance with an embodiment in which computing system 200 comprises part of the Microsoft® Azure® cloud computing platform, request 206 is a call to a List Keys API (API) call, which is an example of APIs 202. Request 206 may specify, among other things, an identifier of the user or role that is attempting to access the resource, an identifier of the resource, and an identifier of the cloud-based subscription.

Resource manager 220 is configured to determine whether the requesting entity has permissions to access the resource that the entity is attempting to access. For instance, resource manager 220 may utilize RBAC functionality 204 to determine whether the requesting entity is authorized to access the resource. may include role-based access control functionality. Upon determining that the entity (e.g., a user, role, or subscription) is authorized to access the resource, resource manager 220 may retrieve the access key associated with the entity and the resource from a data store (e.g., maintained via storage node(s) 110A-110N) configured to store a plurality of access keys 208. Resource manager 200 provides the retrieved access key to portal via a response 210 that includes the access key that enables access to that resource.

Resource manager 220 logs request 206 and characteristics thereof in a log of log(s) 234. For instance, the log may store an identifier for request 206, an indication as to whether request 206 was successful or unsuccessful (i.e., whether an access key was granted for request 206), an identifier of the resource that is accessed or was attempted to be accessed, a time stamp indicating a time at which the request 206 was issued and/or completed, a network address from which request 206 was issued (e.g., the network address associated with the computing device from which portal 222 was accessed), an application identifier that identifies an application (e.g., portal 222) from which request 206 was issued, a user identifier associated with a user (e.g., a username by which the user logged into portal 222) that issued request 206, an identifier of the cloud-based subscription from which the resource was accessed or attempted to be accessed, a type of the entity (e.g., a user, a role, a service principal, etc.) that issued request 206, a type of authentication scheme (e.g., password-based authentication, certificate-based authentication, biometric authentication, token-based authentication, multi-factor authentication, etc.) utilized by the entity that issued request 206, an ASN number associated with the entity that issued request 206, etc.

Upon receiving response 210, portal 222 may send a request 212 to storage platform 226 that comprises the access key and an identifier of the resource attempting to be accessed. Storage platform 226 determines whether request 212 comprises a valid access key for the resource being attempted to be accessed. Upon determining that request comprises a valid access key, storage platform 226 provides portal 222 access to the resource, and the resource may become viewable and/or accessible via portal 222. Request for data maintained by storage platform 226, such as request 212, be referred to as a data plane operation.

Figure 3:
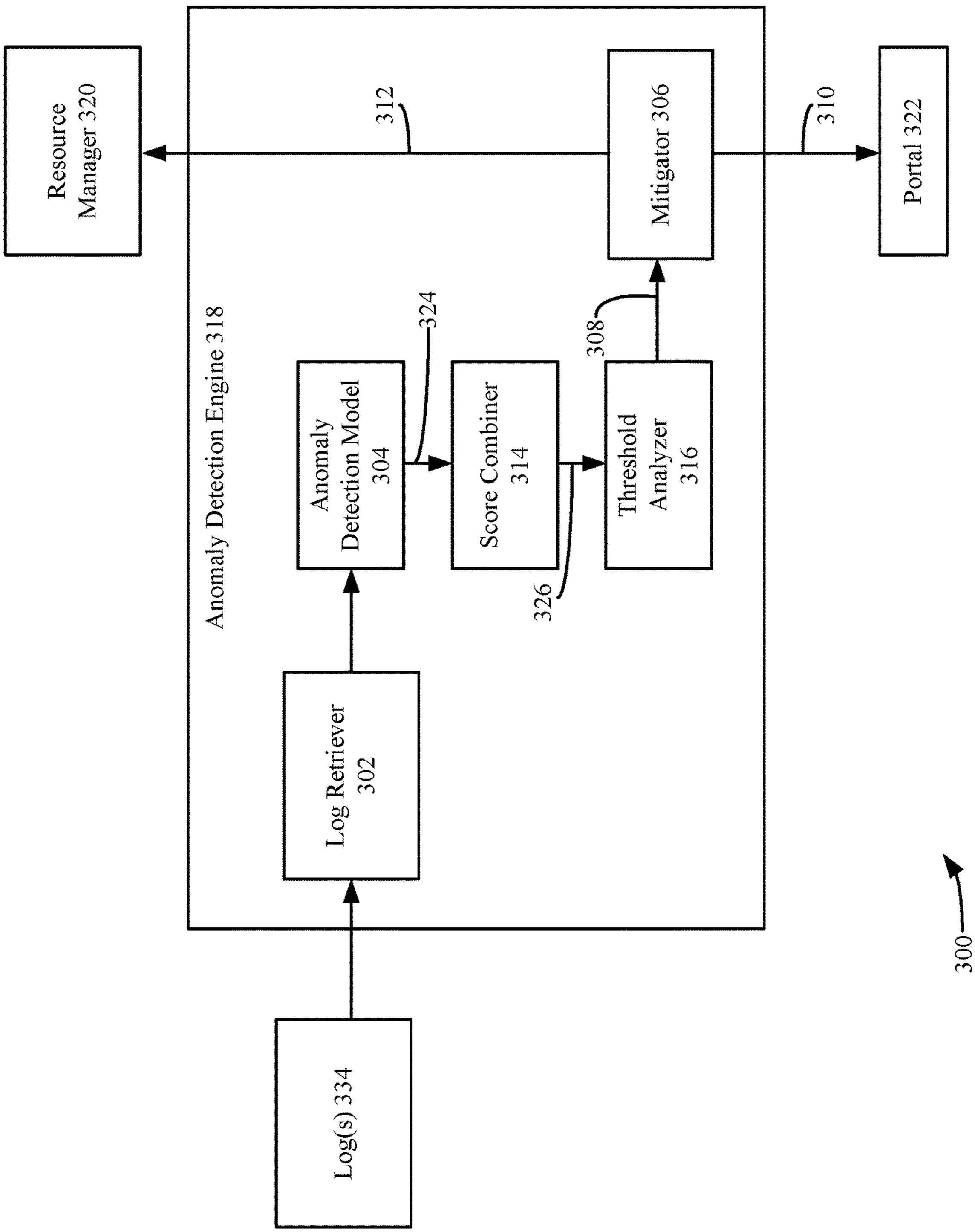
FIG. 3 shows a block diagram of a system configured to detect anomalous behavior with respect to control plane operations in accordance with an example embodiment.

FIG. 3 shows a block diagram of a system 300 configured to detect anomalous behavior with respect to control plane operations, according to an example embodiment. As shown in FIG. 3, system 300 comprises an anomaly detection engine 318, a resource manager 320, and a portal 322. Anomaly detection engine 318, resource manager 320, and portal 322 are examples of anomaly detection engine 118, resource manager 120, and portal 122, as described above with reference to FIG. 1. As shown in FIG. 3, anomaly detection engine 318 may comprise a log retriever 302, an anomaly detection model 304, a score combiner 314, a threshold analyzer 316, and a mitigator 306. It is noted that one or more of log retriever 302, anomaly detection model 304, score combiner 314, threshold analyzer 316, and/or mitigator 306 may be incorporated with each other.

Log retriever 302 is configured to retrieve one or more logs 334, which are examples of log(s) 234, as described above with reference to FIG. 2. Log retriever 302 may be configured to retrieve log(s) 334 on a periodic basis (e.g., hourly, daily, weekly, monthly, etc.). However, it is noted that the embodiments described herein are not so limited. For instance, log retriever 302 may be configured to retrieve log(s) 334 responsive to receiving a command initiated by a user (e.g., an administrator) or another application. To retrieve log(s) 334, log retriever 302 may provide a query to a data store (e.g., a database) that stores log(s) 334. The query may specify an entity and/or a time range for log(s) 334 (e.g., the last seven days of log(s) 334 for a particular username, role, or a cloud-based subscription). The retrieved log(s) retrieved are provided to anomaly detection model 304.

In accordance with an embodiment in which anomaly detection model 304 is a machine learning-based model, the data included in retrieved log(s) may be featurized. The data may include, but is not limited to, an identifier for the control plane operation, an indication as to whether the control plane operation was successful or unsuccessful, an identifier of the resource that is accessed or was attempted to be accessed, a time stamp indicating a time at which the control plane operation was issued, a network address from which the control plane operation was issued, an application identifier that identifies an application (e.g., portal 322, etc.) from which the control plane operation was issued, a user identifier associated with a user (e.g., a username by which the user logged into portal 322) that issued the control plane operation, an identifier of the cloud-based subscription from which the resource was accessed or attempted to be accessed, a type of the entity (e.g., a user, a role, a service principal, etc.) that issued the control plane operation, a type of authentication scheme (e.g., password-based authentication, certificate-based authentication, biometric authentication, token-based authentication, multi-factor authentication, etc.) utilized by the entity that issued the control plane operation, an ASN number associated with the entity that issued the control plane operation, etc. The featurized data may take the form of one or more feature vectors, which are provided to anomaly detection model 304. The feature vector(s) may take any form, such as a numerical, visual and/or textual representation, or may comprise any other form suitable for representing log(s) 334. In an embodiment, the feature vector(s) may include features such as keywords, a total number of words, and/or any other distinguishing aspects relating to log(s) 334 that may be extracted therefrom. Log(s) 334 may be featurized using a variety of different techniques, including, but not limited to, time series analysis, keyword featurization, semantic-based featurization, digit count featurization, and/or n-gram-TFIDF featurization.

Anomaly detection model 304 is configured to analyze the characteristics of control plane operations specified by the retrieved log(s) and detect anomalous control plane operations based on the analysis. For instance, for each of one or more of the characteristics of a particular control plane operation, anomaly detection model 304 may generate a score indicating whether the characteristic is anomalous with respect to the control plane operation.

For instance, anomaly detection model 304 may determine whether a control plane operation was issued from an unknown entity. For example, if the network address, application identifier, user identifier, cloud-based subscription identifier and/or the ASN number from which the control plane was issued is atypical (e.g., the control plane operation was issued from any of such identifiers that have not been seen before), then the score generated for such characteristics may be relatively higher. Otherwise, the score for such identifiers may be relatively lower.

In accordance with an embodiment, for each resource, anomaly detection engine 318 may maintain a list of network address identifiers, application identifiers, user identifiers, cloud-based subscription identifiers and/or ASN identifiers that are known to be non-malicious and/or are approved to access the resource. If control plane operation is issued via a network address, an application, a user, a subscription, and/or an ASN that is not in the list, then anomaly detection model 304 may determine that the control plane operation is anomalous and generate one or more scores (respectively corresponding to one or more identifiers described above) accordingly. Anomaly detection model 304 may be a statistical-based model (e.g., a Poisson probabilistic model, a graph model, etc.) or a machine learning-based model that learns (via a training process) what constitutes non-malicious entities (e.g., non-malicious network addresses, applications, users, subscriptions, ASNs, etc.) and learns what constitutes malicious entities (e.g., malicious network addresses, applications, users, subscriptions, ASNs, etc.) for a given resource over time. Examples of machine learning-based models include, but are not limited to, an unsupervised machine learning algorithm or a neural network-based machine learning algorithm (e.g., a recurrent neural network (RNN)-based machine learning algorithm, such as, but not limited to a long short-term memory (LSTM)-based machine learning algorithm).

In another example, anomaly detection model 304 may determine whether access to a particular resource from a particular user, cloud-based subscription, ASN, network address, etc. is atypical (e.g., whether a resource is being accessed by any of such identifiers that have not been seen before for the resource). For example, this may detect whether a known (or non-malicious) entity is accessing a resource that the entity never accessed before (which may be indicative of that entity's credentials being compromised). If any of such identifiers are determined to be atypical for accessing the resource, then the score generated for such identifiers and/or the identifier for the resource may be relatively higher. Otherwise, the score for such identifiers may be relatively lower.

In accordance with an embodiment, for each network address identifier, application identifier, user identifier, cloud-based subscription identifier and/or ASN identifier, anomaly detection engine 318 may maintain resources that are typically accessed thereby. If control plane operation is issued for a particular resource via a network address, an application, a user, a subscription, and/or an ASN that is not in the list, then anomaly detection model 304 may determine that the control plane operation is anomalous and generate one or more scores (respectively corresponding to one or more identifiers described above) accordingly. Anomaly detection model 304 may be a statistical-based model (e.g., that models the pair probability between a pair of variables (e.g., the resource and a network address, the resource and the user, the resource, and the cloud-based subscription, the resource and the network address, the resource and the application, the resource and the ASN, etc.), utilizing similarity index-based approaches, collaborative filter-based approaches, etc. Alternatively, anomaly detection model 304 may be a machine learning-based model that learns (via a training process) which entities typically access a particular resource over time. Examples of machine learning-based models include, but are not limited to, an unsupervised machine learning algorithm or a neural network-based machine learning algorithm (e.g., a recurrent neural network (RNN)-based machine learning algorithm, such as, but not limited to a long short-term memory (LSTM)-based machine learning algorithm).

In yet another example, anomaly detection model 304 may determine the authentication scheme used when issuing the control plane operation. If the authentication scheme is a relatively week scheme (e.g., password-based authentication), then anomaly detection model 304 may generate a score for the authentication scheme indicator that is relatively high. If the authentication scheme is a relatively strong scheme (e.g., multi-factor authentication), then anomaly detection model 304 may generate a score for the authentication scheme indicator that is relatively low.

Each score generated for a particular characteristic (shown as score(s) 324) may be provided to score combiner 314. Score combiner 314 may be configured to combine score(s) 324 to generate an overall anomaly score 326 with respect to the control plane operation. For example, score combiner 314 may add score(s) 324 to generate overall (or cumulative) anomaly score 326. Overall anomaly score 326 may indicate a probability whether the control plane operation is indicative of anomalous behavior. For example, overall anomaly score 326 may comprise a value between 0.0 and 1.0, where higher the value, the greater the likelihood that the control plane operation is anomalous. It is noted that the values described above are purely exemplary and that other values may be utilized to represent overall anomaly score 326. Overall anomaly score 326 may be provided to threshold analyzer 316.

Threshold analyzer 316 may determine whether overall anomaly score 326 meets a threshold condition. If a determination is made that overall anomaly score 326 meets the threshold condition, then threshold analyzer 316 determines that the control plane operation is anomalous, and that anomalous behavior has occurred with respect to the entity that issued the control plane operation. If a determination is made that overall anomaly score 326 does not meet the threshold condition, then threshold analyzer 316 determines that the control plane operation is not anomalous, and that anomalous behavior has not occurred with respect to the entity that issued the control plane operation.

In accordance with an embodiment, the threshold condition may be a predetermined value. In accordance with such an embodiment, threshold analyzer 316 may be configured in one of many ways to determine that the threshold condition has been met. For instance, threshold analyzer 316 may be configured to determine that the threshold condition has been met if overall anomaly score is less than, less than or equal to, greater than or equal to, or greater than the predetermined value.

Responsive to determining that anomalous behavior has occurred, threshold analyzer 316 may provide a notification 308 to mitigator 306 that indicates that anomalous behavior has been detected. Responsive to receiving notification 308, mitigator 306 may cause a mitigation action to be performed that mitigates the anomalous behavior. For example, mitigator 308 may issue a notification 310 that is displayed via portal 322. Notification 310 may indicate that anomalous behavior has been detected and/or may provide a description of the anomalous behavior (e.g., by specifying the control plane operation determined to be anomalous, specifying the IP address(es) from which the control plane operation was initiated, a time at which the control plane operation occurred, an identifier of the entity that initiated the control plane operation, an identifier of the resource(s) that were accessed or attempted to be accessed, etc.). Mitigator 306 may also cause an access key utilized to access the resource (s) to be changed or cause access to the resource(s) to be restricted for the entity. For instance, mitigator 306 may provide a command 312 to resource manager 320. Responsive to receiving command 312, resource manager 320 may cause an access key utilized to access the resource(s) to be changed and/or cause access to a resource to be restricted (e.g., by limiting or preventing access) for the entity attempting access by updating access and/or permission settings for the entity with regards to the resource.

Figure 4:
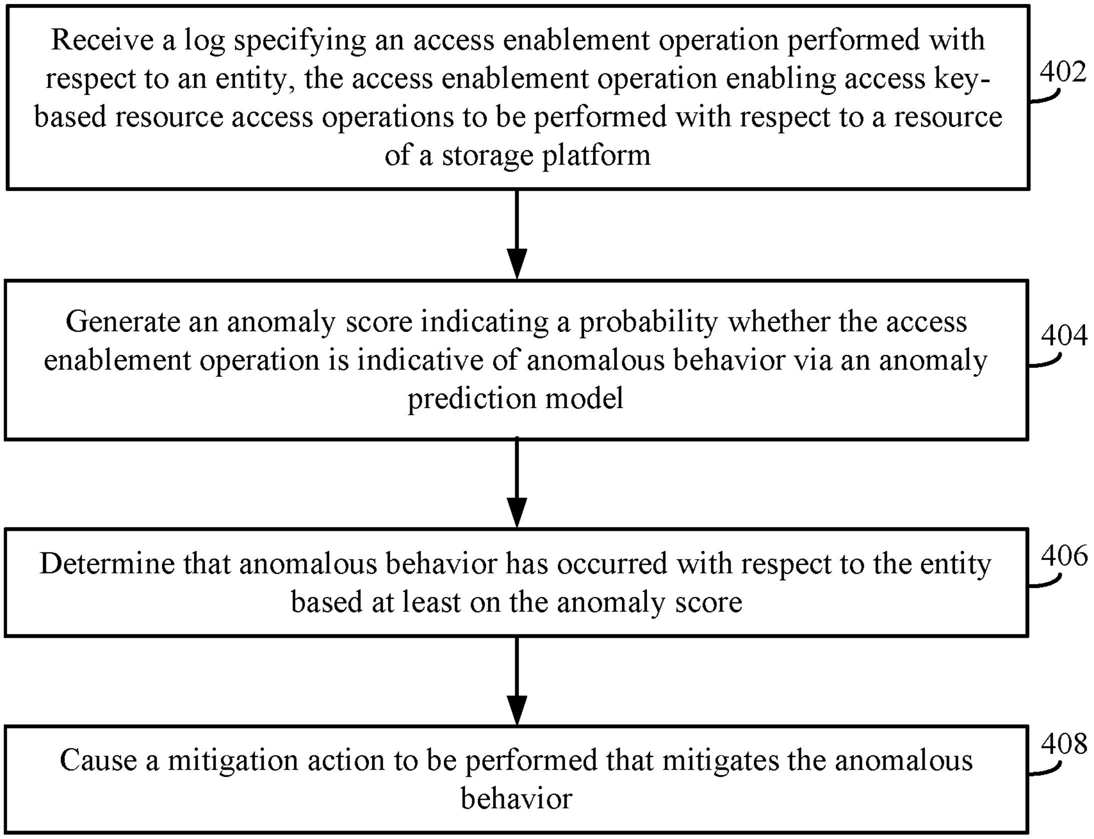
FIG. 4 shows a flowchart of a method for detecting anomalous behavior with respect to control plane operations in accordance with an example embodiment.

Accordingly, the detection of anomalous behavior with respect to control plane operations may be implemented in many ways. For example, FIG. 4 shows a flowchart 400 of a method for detecting anomalous behavior with respect to control plane operations in accordance with an example embodiment. In an embodiment, flowchart 400 may be implemented by anomaly detection engine 318 of system 300 shown in FIG. 3, although the method is not limited to that implementation. Accordingly, flowchart 400 will be described with continued reference to FIG. 3. Other structural and operational embodiments will be apparent to persons skilled in the relevant art(s) based on the discussion regarding flowchart 400 and system 300 of FIG. 3.

Flowchart 400 begins with step 402. In step 402, a log specifying an access enablement operation performed with respect to an entity is received, where the access enablement operation enables access key-based resource access operations to be performed with respect to a resource of a storage platform. For example, with reference to FIG. 3, log retriever 302 is configured to receive a log specifying an access enablement operation performed with respect to an entity. The access enablement operation enables access key-based resource access operations (e.g., read, write, create, update, delete, etc.) with respect to the resource of a storage platform (e.g., storage platform 226, as shown in FIG. 2).

In accordance with one or more embodiments, the access enablement operation of comprises a request for an access key for accessing the resource of the storage platform. In accordance with an embodiment in which computing system 300 comprises part of the Microsoft® Azure® cloud computing platform, the access enablement operation is a List Keys application programming interface (API) call.

In accordance with one or more embodiments, the storage platform comprises at least one of a cloud-based distributed database or a cloud-based distributed file system configured to store unstructured data. An example of a cloud-based distributed database includes, but is not limited to, Azure® Cosmos DB™ owned by Microsoft® Corporation of Redmond, Washington. Examples of cloud-based distributed file systems include, but are not limited to Azure® Data Lake owned by Microsoft® Corporation of Redmond, Washington, Azure® Blob Storage owned by Microsoft® Corporation of Redmond, Washington, etc.

In accordance with one or more embodiments, the entity comprises at least one of a user, a role to which a plurality of users is assigned, or a cloud-based subscription to which the storage platform is associated.

In accordance with one or more embodiments, the log further specifies a plurality of characteristics of the access enablement operation, the plurality of characteristics comprising at least one of an identifier for the access enablement operation, an identifier of the resource, a time stamp indicating a time at which the access enablement operation was issued, a network address from which the access enablement operation was issued, an application identifier that identifies an application from which the access enablement operation was issued, a user identifier associated with a user that issued the access enablement operation, a type of the entity that issued the access enablement operation, a type of authentication scheme utilized by the entity that issued the access enablement operation, or an autonomous system number associated with the entity that issued the access enablement operation. For example, with reference to FIG. 3, log(s) 334 may further specify such plurality of characteristics of the access enablement operation.

In step 404, an anomaly score indicating a probability whether the access enablement operation is indicative of anomalous behavior is generated via an anomaly prediction model. For example, score combiner 314 generates overall anomaly score 326 based on score(s) 324 generated by anomaly detection model 304. Overall anomaly score 326 indicates a probability whether the access enablement operation is indicative of anomalous behavior. Additional details regarding generating overall anomaly score 326 is provided below with reference to FIG. 5.

In step 406, a determination is made that anomalous behavior has occurred with respect to the entity based at least on the anomaly score. For example, with reference to FIG. 3, threshold analyzer 316 determines that anomalous behavior has occurred with respect to the entity based at least on overall anomaly score 326. Additional details regarding determining that anomalous behavior has occurred is provided below with reference to FIG. 6.

In step 408, based on a determination that the anomalous behavior has occurred, a mitigation action is caused to be performed that mitigates the anomalous behavior. For example, with reference to FIG. 3, mitigator 306 causes a mitigation action to be performed that mitigates the anomalous behavior.

In accordance with one or more embodiments, causing the mitigation action to be performed comprises at least one of providing a notification that indicates that the anomalous behavior was detected, causing an access key utilized to access the at least one resource to be changed, or causing access to the at least one resource to be restricted for the entity. For example, with reference to FIG. 3, mitigator 306 may provide a notification 310 to portal 322 that indicates that the anomalous behavior was detected. In another example, mitigator 306 may provide command 312 to resource manager 320 that instructs resource manager 320 to change the access key utilized to access the at least one resource and/or instructs resource manager 320 to restrict access for the entity to the at least one resource.

Figure 5:
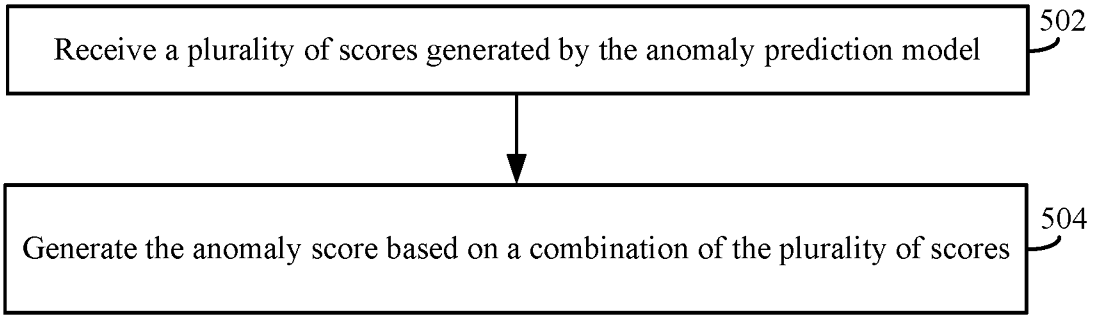
FIG. 5 shows a flowchart of a method for generating an anomaly score in accordance with an example embodiment.

FIG. 5 shows a flowchart 500 of a method for generating an anomaly score in accordance with an example embodiment. In an embodiment, flowchart 500 may be implemented by anomaly detection engine 318 of system 300 shown in FIG. 3, although the method is not limited to that implementation. Accordingly, flowchart 500 will be described with continued reference to FIG. 3. Other structural and operational embodiments will be apparent to persons skilled in the relevant art(s) based on the discussion regarding flowchart 500 and system 300 of FIG. 3.

Flowchart 500 begins with step 502. In step 502, a plurality of scores generated by the anomaly prediction model is received. For each of the plurality of characteristics, a respective score of the plurality of scores is received indicating whether a corresponding characteristic of the plurality of characteristics is anomalous. For example, with reference to FIG. 3, anomaly detection model 304 generates score(s) 324. Each of score(s) 324 indicate whether a corresponding characteristic is anomalous.

In step 504, the anomaly score is generated based on a combination of the scores received by the anomaly prediction model. For example, with reference to FIG. 3, score combiner 314 generates overall anomaly score 326 based on a combination of score(s) 324.

Figure 6:
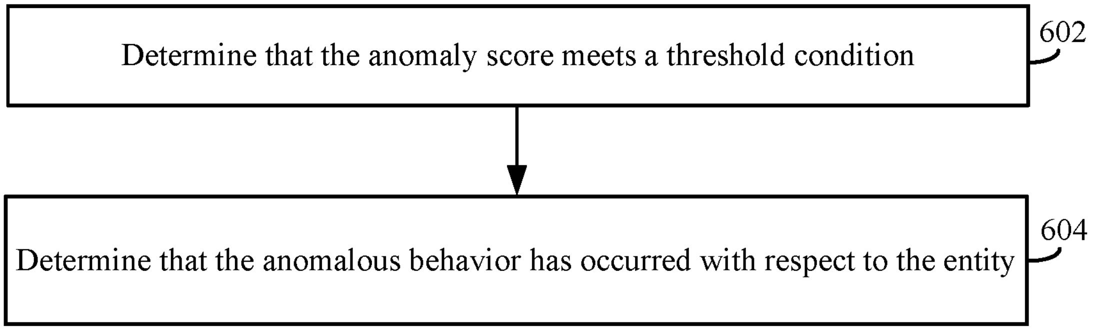
FIG. 6 shows a flowchart of a method for determining that anomalous behavior has occurred based on a threshold condition in accordance with an example embodiment.

FIG. 6 shows a flowchart 600 of a method for determining that anomalous behavior has occurred based on a threshold condition in accordance with an example embodiment. In an embodiment, flowchart 600 may be implemented by anomaly detection engine 318 of system 300 shown in FIG. 3, although the method is not limited to that implementation. Accordingly, flowchart 600 will be described with continued reference to FIG. 3. Other structural and operational embodiments will be apparent to persons skilled in the relevant art(s) based on the discussion regarding flowchart 600 and system 300 of FIG. 3.

Flowchart 600 begins with step 602. In step 602, a determination is made that the anomaly score meets a threshold condition. For example, with reference to FIG. 3, threshold analyzer 316 determines that overall anomaly score 326 meets a threshold condition.

In step 604, responsive to determining that the anomaly score meets the threshold condition, a determination is made that the anomalous behavior has occurred with respect to the entity. For example, with reference to FIG. 3, threshold analyzer 316, responsive to determining that overall anomaly score 326 meets the threshold condition, determines that the anomalous behavior has occurred with respect to the entity.

III. Example Computer System Implementation

The systems and methods described above in reference to FIGS. 1-6, may be implemented in hardware, or hardware combined with one or both of software and/or firmware. For example, system 700 may be used to implement any of nodes 108A-108N and/or 112A-112N, storage node(s) 110A-110N, anomaly detection engine 118, resource manager 120, portal 122, storage platform 126, computing device 104, and/or browser 106 of FIG. 1, resource manager 220, storage platform 226, and/or portal 222 of FIG. 2, anomaly detection engine 318, resource manager 320, portal 332, log retriever 302, anomaly detection model 304, mitigator 306, score combiner 314, and/or threshold analyzer 316 of FIG. 3, and/or any of the components respectively described therein, and flowcharts 400, 500, and/or 600 may be each implemented as computer program code/instructions configured to be executed in one or more processors and stored in a computer readable storage medium. Alternatively, any of nodes 108A-108N and/or 112A-112N, storage node(s) 110A-110N, anomaly detection engine 118, resource manager 120, portal 122, storage platform 126, computing device 104, and/or browser 106 of FIG. 1, resource manager 220, storage platform 226, and/or portal 222 of FIG. 2, anomaly detection engine 318, resource manager 320, portal 332, log retriever 302, anomaly detection model 304, mitigator 306, score combiner 314, and/or threshold analyzer 316 of FIG. 3, and/or any of the components respectively described therein, and flowcharts 400, 500, and/or 600 may be implemented as hardware logic/electrical circuitry. In an embodiment, any of nodes 108A-108N and/or 112A-112N, storage node(s) 110A-110N, anomaly detection engine 118, resource manager 120, portal 122, storage platform 126, computing device 104, and/or browser 106 of FIG. 1, resource manager 220, storage platform 226, and/or portal 222 of FIG. 2, anomaly detection engine 318, resource manager 320, portal 332, log retriever 302, anomaly detection model 304, mitigator 306, score combiner 314, and/or threshold analyzer 316 of FIG. 3, and/or any of the components respectively described therein, and flowcharts 400, 500, and/or 600 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 7:
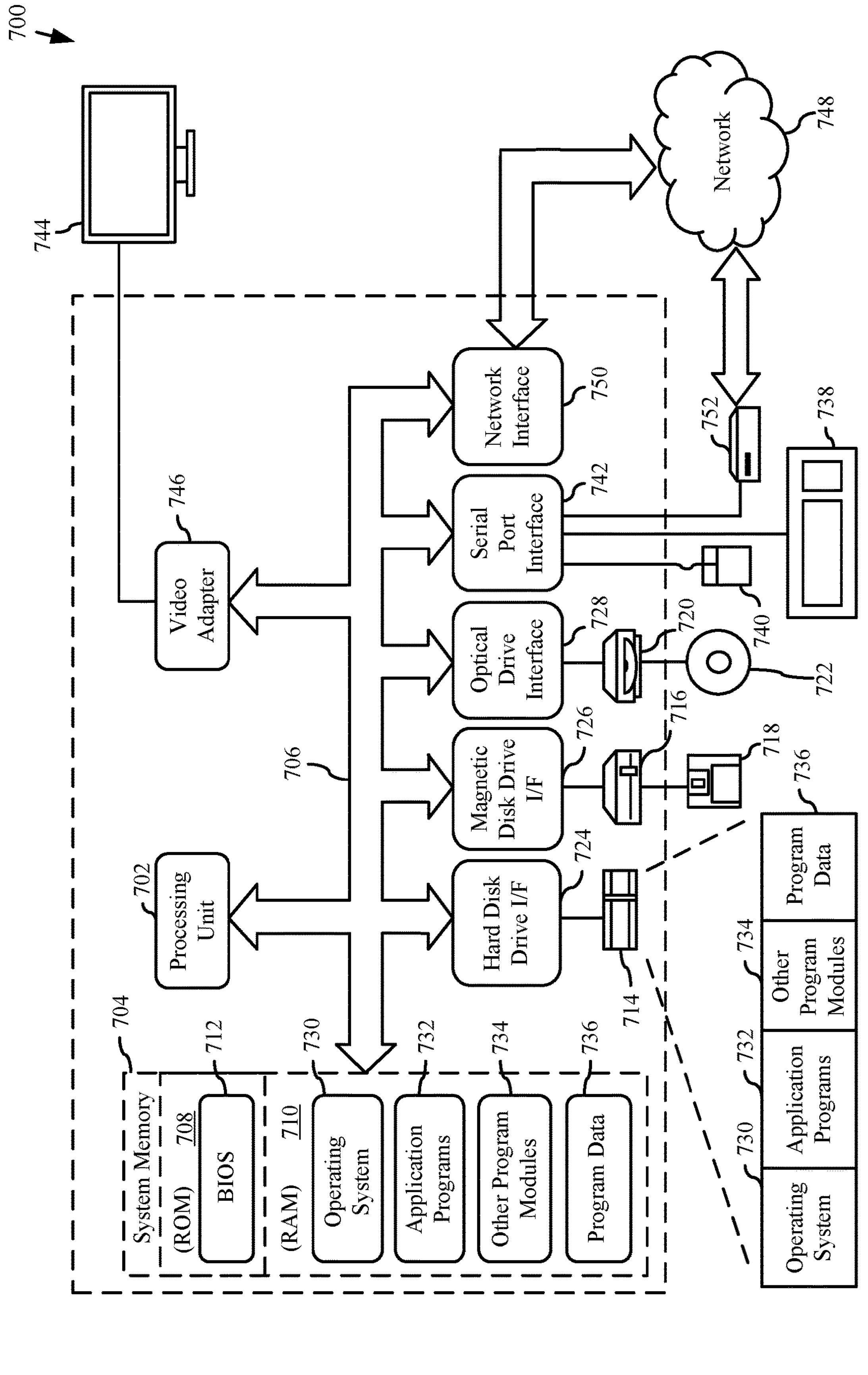
FIG. 7 is a block diagram of an example processor-based computer system that may be used to implement various embodiments.

FIG. 7 depicts an exemplary implementation of a computing device 700 in which embodiments may be implemented, including any of nodes 108A-108N and/or 112A-112N, storage node(s) 110A-110N, anomaly detection engine 118, resource manager 120, portal 122, storage platform 126, computing device 104, and/or browser 106 of FIG. 1, resource manager 220, storage platform 226, and/or portal 222 of FIG. 2, anomaly detection engine 318, resource manager 320, portal 332, log retriever 302, anomaly detection model 304, mitigator 306, score combiner 314, and/or threshold analyzer 316 of FIG. 3, and/or any of the components respectively described therein, and flowcharts 400, 500, and/or 600. The description of computing device 700 provided herein is provided for purposes of illustration, and is not intended to be limiting. Embodiments may be implemented in further types of computer systems, as would be known to persons skilled in the relevant art(s).

As shown in FIG. 7, computing device 700 includes one or more processors, referred to as processor circuit 702, a system memory 704, and a bus 706 that couples various system components including system memory 704 to processor circuit 702. Processor circuit 702 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 702 may execute program code stored in a computer readable medium, such as program code of operating system 730, application programs 732, other programs 734, etc. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 and random access memory (RAM) 710. A basic input/output system 712 (BIOS) is stored in ROM 708.

Computing device 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 730, one or more application programs 732, other programs 734, and program data 736. Application programs 732 or other programs 734 may include, for example, computer program logic (e.g., computer program code or instructions) for implementing the systems described above, including the embodiments described above with reference to FIGS. 1-6.

A user may enter commands and information into the computing device 700 through input devices such as keyboard 738 and pointing device 740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 702 through a serial port interface 742 that is coupled to bus 706, but may be connected by other interfaces, such as a parallel port, game port, or a universal serial bus (USB).

A display screen 744 is also connected to bus 706 via an interface, such as a video adapter 746. Display screen 744 may be external to, or incorporated in computing device 700. Display screen 744 may display information, as well as being a user interface for receiving user commands and/or other information (e.g., by touch, finger gestures, a virtual keyboard, by providing a tap input (where a user lightly presses and quickly releases display screen 744), by providing a "touch-and-hold" input (where a user touches and holds his finger (or touch instrument) on display screen 744 for a predetermined period of time), by providing touch input that exceeds a predetermined pressure threshold, etc.). In addition to display screen 744, computing device 700 may include other peripheral output devices (not shown) such as speakers and printers.

Computing device 700 is connected to a network 748 (e.g., the Internet) through an adaptor or network interface 750, a modem 752, or other means for establishing communications over the network. Modem 752, which may be internal or external, may be connected to bus 706 via serial port interface 742, as shown in FIG. 7, or may be connected to bus 706 using another interface type, including a parallel interface.

As used herein, the terms "computer program medium," "computer-readable medium," and "computer-readable storage medium" are used to generally refer to physical hardware media such as the hard disk associated with hard disk drive 714, removable magnetic disk 718, removable optical disk 722, other physical hardware media such as RAMs, ROMs, flash memory cards, digital video disks, zip disks, MEMs, nanotechnology-based storage devices, and further types of physical/tangible hardware storage media (including system memory 704 of FIG. 7). Such computer-readable storage media are distinguished from and non-overlapping with communication media and propagating signals (do not include communication media and propagating signals). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 732 and other programs 734) may be stored on the hard disk, magnetic disk, optical disk, ROM, RAM, or other hardware storage medium. Such computer programs may also be received via network interface 750, serial port interface 752, or any other interface type. Such computer programs, when executed or loaded by an application, enable computing device 700 to implement features of embodiments discussed herein. Accordingly, such computer programs represent controllers of the computing device 700.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Further Example Embodiments

A computer system is described herein. The computer system includes: at least one processor circuit; and at least one memory that stores program code configured to be executed by the at least one processor circuit, the program code comprising: an anomaly detection engine configured to: receive a log specifying an access enablement operation performed with respect to an entity of a storage platform, the access enablement operation enabling access key-based resource access operations to be performed with respect to a resource of the storage platform; generate an anomaly score indicating a probability whether the access enablement operation is indicative of anomalous behavior via an anomaly prediction model; determine that anomalous behavior has occurred with respect to the entity based at least on the anomaly score; and based on a determination that the anomalous behavior has occurred, cause a mitigation action to be performed that mitigates the anomalous behavior.

In one implementation of the foregoing computer system, the log further specifies a plurality of characteristics of the access enablement operation, the plurality of characteristics comprising at least one of: an identifier for the access enablement operation; an identifier of the resource; a time stamp indicating a time at which the access enablement operation was issued; a network address from which the access enablement operation was issued; an application identifier that identifies an application from which the access enablement operation was issued; a user identifier associated with a user that issued the access enablement operation; a type of the entity that issued the access enablement operation; a type of authentication scheme utilized by the entity that issued the access enablement operation; or an autonomous system number associated with the entity that issued the access enablement operation.

In one implementation of the foregoing computer system, the anomaly detection engine is configured to generate the anomaly score by: receiving a plurality of scores generated by the anomaly prediction model, including, for each of the plurality of characteristics, receiving a respective score of the plurality of scores indicating whether a corresponding characteristic of the plurality of characteristics is anomalous; and generating the anomaly score based on a combination of the plurality of scores.

In one implementation of the foregoing computer system, the anomaly detection engine is configured to determine that anomalous behavior has occurred by: determining that the anomaly score meets a threshold condition; and responsive to determining that the anomaly score meets the threshold condition, determining that the anomalous behavior has occurred with respect to the entity.

In one implementation of the foregoing computer system, the access enablement operation comprises a request for an access key for accessing the resource of the storage platform.

In one implementation of the foregoing computer system, the storage platform comprises at least one of: a cloud-based distributed database; or a cloud-based storage repository that stores unstructured data.

In one implementation of the foregoing computer system, the entity comprises at least one of: a user; a role to which a plurality of users is assigned; or a cloud-based subscription to which the storage platform is associated.

In one implementation of the foregoing computer system, the anomaly detection engine is configured to cause the mitigation action to be performed by performing at least one of: providing a notification that indicates that the anomalous behavior was detected; causing an access key utilized to access the resource to be changed; or causing access to the resource to be restricted for the entity.

A method performed by a computing system is also disclosed. The method includes: receiving a log specifying an access enablement operation performed with respect to an entity, the access enablement operation enabling access key-based resource access operations to be performed with respect to a resource of a storage platform; generating an anomaly score indicating a probability whether the access enablement operation is indicative of anomalous behavior via an anomaly prediction model; determining that anomalous behavior has occurred with respect to the entity based at least on the anomaly score; and based on a determination that the anomalous behavior has occurred, causing a mitigation action to be performed that mitigates the anomalous behavior.

In one implementation of the foregoing method, the log further specifies a plurality of characteristics of the access enablement operation, the plurality of characteristics comprising at least one of: an identifier for the access enablement operation; an identifier of the resource; a time stamp indicating a time at which the access enablement operation was issued; a network address from which the access enablement operation was issued; an application identifier that identifies an application from which the access enablement operation was issued; a user identifier associated with a user that issued the access enablement operation; a type of the entity that issued the access enablement operation; a type of authentication scheme utilized by the entity that issued the access enablement operation; or an autonomous system number associated with the entity that issued the access enablement operation.

In one implementation of the foregoing method, said generating the anomaly score comprises: receiving a plurality of scores generated by the anomaly prediction model, including, for each of the plurality of characteristics, receiving a respective score of the plurality of scores indicating whether a corresponding characteristic of the plurality of characteristics is anomalous; and generating the anomaly score based on a combination of the plurality of scores.

In one implementation of the foregoing method, said determining that anomalous behavior has occurred with respect to the entity based at least on the anomaly score comprises: determining that the anomaly score meets a threshold condition; and responsive to determining that the anomaly score meets the threshold condition, determining that the anomalous behavior has occurred with respect to the entity.

In one implementation of the foregoing method, the access enablement operation comprises a request for an access key for accessing the resource of the storage platform.

In one implementation of the foregoing method, the storage platform comprises at least one of: a cloud-based distributed database; or a cloud-based distributed file system configured to store unstructured data.

In one implementation of the foregoing method, the entity comprises at least one of: a user; a role to which a plurality of users is assigned; or a cloud-based subscription to which the storage platform is associated.

In one implementation of the foregoing method, causing the mitigation action to be performed that mitigates the anomalous behavior comprises at least one of: providing a notification that indicates that the anomalous behavior was detected; causing an access key utilized to access the at least one resource to be changed; or causing access to the at least one resource to be restricted for the entity.

A computer-readable storage medium having program instructions recorded thereon that, when executed by at least one processor of a computing system, perform a method. The method includes: receiving a log specifying an access enablement operation performed with respect to an entity, the access enablement operation enabling access key-based resource access operations to be performed with respect to a resource of a storage platform; generating an anomaly score indicating a probability whether the access enablement operation is indicative of anomalous behavior via an anomaly prediction model; determining that anomalous behavior has occurred with respect to the entity based at least on the anomaly score; and based on a determination that the anomalous behavior has occurred, causing a mitigation action to be performed that mitigates the anomalous behavior.

In one implementation of the foregoing computer-readable storage medium, the log further specifies a plurality of characteristics of the access enablement operation, the plurality of characteristics comprising at least one of: an identifier for the access enablement operation; an identifier of the resource; a time stamp indicating a time at which the access enablement operation was issued; a network address from which the access enablement operation was issued; an application identifier that identifies an application from which the access enablement operation was issued; a user identifier associated with a user that issued the access enablement operation; a type of the entity that issued the access enablement operation; a type of authentication scheme utilized by the entity that issued the access enablement operation; or an autonomous system number associated with the entity that issued the access enablement operation.

In one implementation of the foregoing computer-readable storage medium, said generating the anomaly score comprises: receiving a plurality of scores generated by the anomaly prediction model, including, for each of the plurality of characteristics, receiving a respective score of the plurality of scores indicating whether a corresponding characteristic of the plurality of characteristics is anomalous; and generating the anomaly score based on a combination of the plurality of scores.

In one implementation of the foregoing computer-readable storage medium, said determining that anomalous behavior has occurred with respect to the entity based at least on the anomaly score comprises: determining that the anomaly score meets a threshold condition; and responsive to determining that the anomaly score meets the threshold condition, determining that the anomalous behavior has occurred with respect to the entity.

V. Conclusion

While various example embodiments have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosure should not be limited by any of the above-described example embodiments, but should be defined only in accordance with the following claims and their equivalents.

What is claimed is:

1. A computing system, comprising:

at least one processor circuit; and at least one memory that stores program code configured to be executed by the at least one processor circuit, the program code comprising:

an anomaly detection engine configured to:

receive a log specifying a control plane operation performed with respect to an entity of a storage platform, the control plane operation comprising a request to access a list of keys that enable key-based resource access operations to be performed with respect to a resource of the storage platform;

generate an anomaly score for the control plane operation, the anomaly score indicating a probability whether a characteristic of the request to access the list of keys is anomalous via an anomaly prediction model, the characteristic comprising a particular type of authentication scheme from among a plurality of types of authentication schemes utilized by the entity that issued the control plane operation, wherein the entity was authenticated before the control plane operation was performed;

determine that anomalous behavior has occurred with respect to the entity based at least on the anomaly score; and based on a determination that the anomalous behavior has occurred, cause a mitigation action to be performed that mitigates the anomalous behavior by performing least one of:

providing a notification that indicates that the anomalous behavior was detected, causing an access key utilized to access the resource to be changed, or causing access to the resource to be restricted for the entity.

2. The computing system of claim 1, wherein the log further specifies a plurality of characteristics of the control plane operation, the plurality of characteristics comprising at least one of:

an identifier for the control plane operation;

an identifier of the resource;

a time stamp indicating a time at which the control plane operation was issued;

a network address from which the control plane operation was issued;

an application identifier that identifies an application from which the control plane operation was issued;

a user identifier associated with a user that issued the control plane operation;

a type of the entity that issued the control plane operation; or an autonomous system number associated with the entity that issued the control plane operation.

3. The computing system of claim 2, wherein the anomaly detection engine is configured to generate the anomaly score by:

receiving a plurality of scores generated by the anomaly prediction model, including, for each of the plurality of characteristics, receiving a respective score of the plurality of scores indicating whether a corresponding characteristic of the plurality of characteristics is anomalous; and generating the anomaly score based on a combination of the plurality of scores.

4. The computing system of claim 1, wherein the anomaly detection engine is configured to determine that anomalous behavior has occurred by:

determining that the anomaly score meets a threshold condition; and responsive to determining that the anomaly score meets the threshold condition, determining that the anomalous behavior has occurred with respect to the entity.

5. The computing system of claim 1, wherein the control plane operation comprises a request for the access key.

6. The computing system of claim 1, wherein the storage platform comprises at least one of:

a cloud-based distributed database; or a cloud-based storage repository that stores unstructured data.

7. The computing system of claim 1, wherein the entity comprises at least one of:

a user;

a role to which a plurality of users is assigned; or a cloud-based subscription to which the storage platform is associated.

8. A method performed by a computing system, comprising:

receiving a log specifying a control plane operation performed with respect to an entity, the control plane operation comprising a change of a setting or attribute with respect to a resource of a storage platform;

generating an anomaly score for the control plane operation, the anomaly score indicating a probability whether a characteristic of the change of the setting or the attribute is anomalous via an anomaly prediction model, the characteristic comprising an authentication scheme utilized by the entity that issued the control plane operation, wherein the entity was authenticated before the control plane operation was performed;

determining that anomalous behavior has occurred with respect to the entity based at least on the anomaly score; and based on a determination that the anomalous behavior has occurred, causing a mitigation action to be performed that mitigates the anomalous behavior by performing least one of:

providing a notification that indicates that the anomalous behavior was detected, causing an access key utilized to access the resource to be changed, or causing access to the resource to be restricted for the entity.

9. The method of claim 8, wherein the log further specifies a plurality of characteristics of the control plane operation, the plurality of characteristics comprising at least one of:

an identifier for the control plane operation;

an identifier of the resource;

a time stamp indicating a time at which the control plane operation was issued;

a network address from which the control plane operation was issued;

an application identifier that identifies an application from which the control plane operation was issued;

a user identifier associated with a user that issued the control plane operation;

a type of the entity that issued the control plane operation; or an autonomous system number associated with the entity that issued the control plane operation.

10. The method of claim 9, wherein said generating the anomaly score comprises:

receiving a plurality of scores generated by the anomaly prediction model, including, for each of the plurality of characteristics, receiving a respective score of the plurality of scores indicating whether a corresponding characteristic of the plurality of characteristics is anomalous; and generating the anomaly score based on a combination of the plurality of scores.

11. The method of claim 8, wherein said determining that anomalous behavior has occurred with respect to the entity based at least on the anomaly score comprises:

determining that the anomaly score meets a threshold condition; and responsive to determining that the anomaly score meets the threshold condition, determining that the anomalous behavior has occurred with respect to the entity.

12. The method of claim 8, wherein the control plane operation further comprising a request for the access key.

13. The method of claim 8, wherein the storage platform comprises at least one of:

a cloud-based distributed database; or a cloud-based storage repository that stores unstructured data.

14. The method of claim 8, wherein the entity comprises at least one of:

a user;

a role to which a plurality of users is assigned; or a cloud-based subscription to which the storage platform is associated.

15. A computer-readable storage medium having program instructions recorded thereon that, when executed by at least one processor of a computing system, perform a method, the method comprising:

receiving a log specifying a control plane operation performed with respect to an entity, the control plane operation comprising a management operation for a cloud-based resource;

generating an anomaly score for the control plane operation, the anomaly score indicating a probability whether a characteristic of the management operation for the cloud-based resource is anomalous via an anomaly prediction model, the characteristic comprising a particular type of authentication scheme from among a plurality of types of authentication schemes utilized by the entity that issued the control plane operation, wherein the entity was authenticated before the control plane operation was performed;

determining that anomalous behavior has occurred with respect to the entity based at least on the anomaly score; and based on a determination that the anomalous behavior has occurred, causing a mitigation action to be performed that mitigates the anomalous behavior by performing least one of:

providing a notification that indicates that the anomalous behavior was detected, causing an access key utilized to access the resource to be changed, or causing access to the resource to be restricted for the entity.

16. The computer-readable storage medium of claim 15, wherein the log further specifies a plurality of characteristics of the control plane operation, the plurality of characteristics comprising at least one of:

an identifier for the control plane operation;

an identifier of the resource;

a time stamp indicating a time at which the control plane operation was issued;

a network address from which the control plane operation was issued;

an application identifier that identifies an application from which the control plane operation was issued;

a user identifier associated with a user that issued the control plane operation;

a type of the entity that issued the control plane operation; or an autonomous system number associated with the entity that issued the control plane operation.

17. The computer-readable storage medium of claim 16, wherein said generating the anomaly score comprises:

receiving a plurality of scores generated by the anomaly prediction model, including, for each of the plurality of characteristics, receiving a respective score of the plurality of scores indicating whether a corresponding characteristic of the plurality of characteristics is anomalous; and generating the anomaly score based on a combination of the plurality of scores.

18. The computer-readable storage medium of claim 15, wherein said determining that anomalous behavior has occurred with respect to the entity based at least on the anomaly score comprises:

determining that the anomaly score meets a threshold condition; and responsive to determining that the anomaly score meets the threshold condition, determining that the anomalous behavior has occurred with respect to the entity.

19. The computer-readable storage medium of claim 15, wherein the cloud-based resource comprises at least one of:

a cloud-based distributed database; or a cloud-based storage repository that stores unstructured data.

20. The computer-readable storage medium of claim 15, wherein the entity comprises at least one of:

a user;

a role to which a plurality of users is assigned; or a cloud-based subscription to which the storage platform is associated.

* * * * *